July 1, 1924.

V. R. NICHOLSON

FLOW METER

Filed Oct. 6, 1923

1,499,839

2 Sheets-Sheet 1

Inventor
V. R. Nicholson

Atty

Patented July 1, 1924.

1,499,839

UNITED STATES PATENT OFFICE.

VICTOR RALPH NICHOLSON, OF COLCHESTER, ENGLAND.

FLOW METER.

Application filed October 6, 1923. Serial No. 666,961.

*To all whom it may concern:*

Be it known that I, VICTOR RALPH NICHOLSON, a British subject, and resident of Britannia Works, Colchester, in the county of Essex, England, have invented certain new and useful Improvements in Flow Meters, of which the following is a specification, such as will enable others skilled in the art to which it appertains to make and use the same.

This invention relates to an instrument for indicating the rate of flow of fluid and is of that kind in which the fluid is passed through a passage say a cylinder and in so doing is adapted by pressure to move a body or part by which the indicator is operated in either direct or indirect manner. This body or part I will refer to as a piston but it must be understood that any suitably shaped body may be employed.

The invention can be carried out in various manners in all of which the flow of the liquid will move the piston either against gravity or the pressure or tension of a spring, or both.

According to my invention magnetic influence between the piston and the indicator is employed to move the latter, and the piston and that part of the cylinder in which it is fitted or a device in it are so constructed that as the piston moves from its zero position the passage for the fluid is gradually increased in cross sectional area. This may be accomplished in several ways such, for example, as by fitting the piston into a slightly tapered cylinder the narrower end of which is the zero position: or the piston could be in a parallel cylinder and have a hole through it fitting over a tapered rod. In the former of these examples the annular space between the periphery of the piston and the inside of the cylinder will increase as the piston moves from zero and in the latter example the space between the rod and the edge of the hole will increase.

It will be understood that if the fluid is under pressure but the flow is stopped the piston will have an equal pressure on both its ends, and that it is the difference in pressures on the two ends of the piston when the fluid is flowing that effects the movement by lifting the piston to a position in which its weight and the lesser pressure, that is the pressure on the outlet side, balance the pressure on the inlet side.

Any suitable form of indicator may be used and when the rate of flow is reduced the piston moves under the influence of a spring or by gravity, or it may be both, and in so doing causes the indicator to fall in relation to a scale.

Two examples of my invention are shown in the accompanying drawings in which:—

Figures 1, 2:
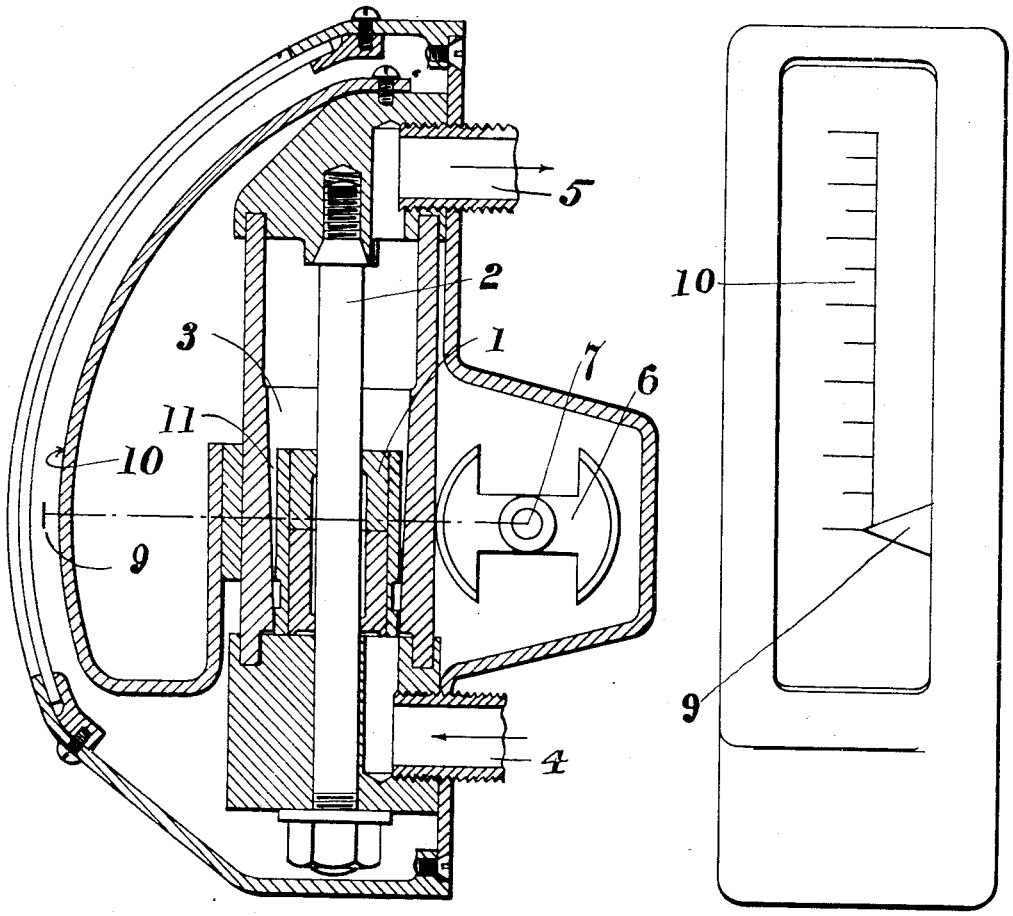

Fig. 1 shows a construction in which a piston 1 is arranged to slide on a rod 2 in a fluid passage 3 with inlet and outlet 4 and 5 respectively. This piston is a permanent magnet and adjacent to it an armature 6 is pivoted at 7 in the case 8. On the spindle of this armature is an indicator 9 moving over a scale 10 of which a front view is seen in Fig. 2.

The piston 1 is cylindrical but the passage is slightly tapered so that when the piston rises under the pressure of fluid the annular space between it and the wall of the passage increases. This is clearly seen at 11.

In this form the pressure of fluid acts upon the lower end of the piston to a greater extent than it does on the upper end when the fluid is allowed to flow. This lifts the piston to a distance proportionate to the difference in pressures. When the piston rises its magnetic effect on the armature is to turn it on its pivot and thus raise the indicator. Conversely the fall of the piston has the effect of reversing the movement of the armature and indicator.

Figure 3:
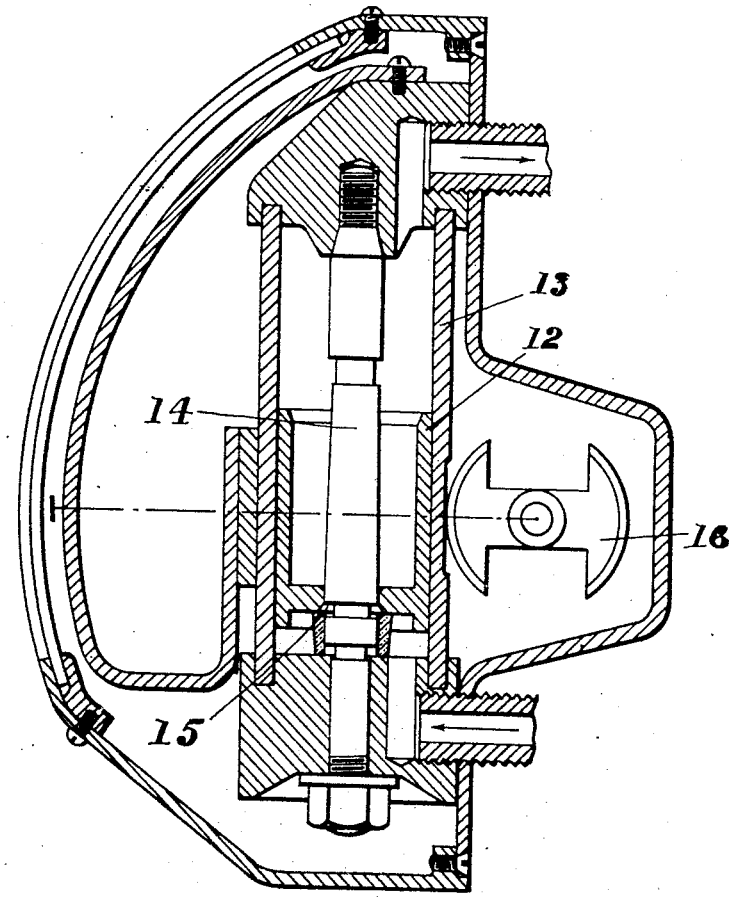

Fig. 3 shows a somewhat similar construction but in this case the piston 12 is a close but easy fit in the cylinder 13 and is slidably mounted on a tapered spindle 14. The fluid enters below the piston as in Fig. 1 but passes through the annular opening 15 in the piston between it and the spindle, the area of the space between the piston and the spindle increases as the piston rises. The piston is magnetized and acts on the armature 16 in the manner described with relation to Fig. 1. The front view of the device seen in Fig. 2 is applicable to both the constructions seen in Figs. 1 and 2.

What I claim is:—

1. In an instrument for indicating the rate of flow of liquid, a cylinder, a piston operative in the cylinder under the pressure of liquid and comprising a permanent magnet, and an indicator influenced in the movement of said piston magnet, the piston passage in the cylinder being of variable cross sectional area between the limits of movement of the piston magnet.

2. In an instrument for indicating the rate of flow of liquid, a casing having a passage therein for liquid flow, a magnetic body forming a piston operable in said passage, the sectional area of the passage increasing in the direction of flow of the liquid with its minimum cross sectional area substantially that of the magnetic piston, an armature pivoted beyond the casing and open to the influence of the magnetic piston in the movement of the latter, and an indicator operated by said armature.

3. A flow meter comprising a casing having a fluid passage therein, said passage being of increasing sectional area in the direction of flow of the liquid, a magnetic body forming a piston arranged in said passage, said piston substantially closing the passage at the point of minimum cross sectional area of the latter, means for guiding the piston longitudinally of the passage, an armature arranged in the casing beyond the passage and influenced by the magnetic piston, and an indicator movable in the casing and connected to the armature.

In witness whereof I have hereunto set my hand in presence of a witness.

VICTOR RALPH NICHOLSON.

Witness:
HY FAIRBROTHER.